(12) United States Patent
McKinley

(10) Patent No.: US 6,638,001 B1
(45) Date of Patent: Oct. 28, 2003

(54) GAME LIFTING APPARATUS

(76) Inventor: Perry A. McKinley, P.O. Box 104, Fulton, AL (US) 36446

( * ) Notice: Subject to any disclaimer, the term of this patent is extended or adjusted under 35 U.S.C. 154(b) by 0 days.

(21) Appl. No.: 10/071,292

(22) Filed: Feb. 11, 2002

(51) Int. Cl.[7] .................................................. B60P 1/44
(52) U.S. Cl. ..................... 414/462; 224/401; 224/412; 224/413; 224/447; 224/488; 224/921; 414/546
(58) Field of Search ................. 414/462, 465, 414/466, 546; 211/170; 224/401, 412, 413, 447, 488, 921

(56) References Cited

U.S. PATENT DOCUMENTS

| | | | | |
|---|---|---|---|---|
| 4,176,771 A | * | 12/1979 | Dubroc, Sr. | 224/412 |
| 5,219,106 A | * | 6/1993 | Glunt | 224/42.07 |
| 5,662,451 A | * | 9/1997 | Muzzi | 414/540 |
| 5,911,556 A | * | 6/1999 | Caldwell | 414/462 |
| D415,448 S | * | 10/1999 | Deutschman | D12/107 |
| 5,964,565 A | * | 10/1999 | Skotzky | 414/462 |
| 6,125,508 A | * | 10/2000 | Formenti | 16/335 |
| 6,138,991 A | * | 10/2000 | Myers, Jr. | 254/323 |
| 6,435,801 B2 | * | 8/2002 | Talbott | 414/462 |
| 6,457,618 B1 | * | 10/2002 | Hancock et al. | 224/401 |
| 6,461,095 B1 | * | 10/2002 | Puska | 414/462 |
| 6,477,736 B1 | * | 11/2002 | Abernathy | 16/72 |
| 2002/0168257 A1 | * | 11/2002 | Smith | 414/462 |

* cited by examiner

Primary Examiner—Janice L. Krizek

(57) ABSTRACT

A game lifting apparatus for lifting and loading a game animal upon a rack of a prime mover such as an ATV. The game lifting apparatus includes a rack support assembly including a rack support member being adapted to securely mount to a prime mover, and also including bracket members being fastenable to the rack support member; and also includes a rack assembly being attached to the bracket members for supporting and lifting a game thereupon.

8 Claims, 4 Drawing Sheets

GAME LIFTING APPARATUS

BACKGROUND OF THE INVENTION

1. Field of the Invention

The present invention relates to game animal lifters and more particularly pertains to a new game lifting apparatus for lifting and loading a game animal upon a rack of a prime mover such as an ATV.

2. Description of the Prior Art

The use of game animal lifters is known in the prior art. More specifically, game animal lifters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,662,451; U.S. Pat. No. 5,964,565; U.S. Pat. No. 5,911,556; U.S. Pat. No. 4,176,771; U.S. Pat. No. 5,219,106; and U.S. Pat. No. Des. 415,448.

While these devices fulfill their respective, particular objectives and requirements, the aforementioned patents do not disclose a new game lifting apparatus. The prior art described inventions having carriers mounted upon the prime movers and having frames upon which the game animal is moved.

SUMMARY OF THE INVENTION

The general purpose of the present invention, which will be described subsequently in greater detail, is to provide a new game lifting apparatus which has many of the advantages of the game animal lifters mentioned heretofore and many novel features that result in a new game lifting apparatus which is not anticipated, rendered obvious, suggested, or even implied by any of the prior art game animal lifters, either alone or in any combination thereof. The present invention includes a rack support assembly including a rack support member being adapted to securely mount to a prime mover, and also including bracket members being fastenable to the rack support member; and also includes a rack assembly being attached to the bracket members for supporting and lifting a game thereupon. None of the prior art describes a rack assembly which attached to the prime mover which is pivotally raised and lowered to allow the user to easily move the game animal upon the prime mover.

There has thus been outlined, rather broadly, the more important features of the game lifting apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new game lifting apparatus which has many of the advantages of the game animal lifters mentioned heretofore and many novel features that result in a new game lifting apparatus which is not anticipated, rendered obvious, suggested, or even implied by any of the prior art game animal lifters, either alone or in any combination thereof.

Still another object of the present invention is to provide a new game lifting apparatus for lifting and loading a game animal upon a rack of a prime mover such as an ATV.

Still yet another object of the present invention is to provide a new game lifting apparatus that is easy and convenient to attach to the prime mover.

Even still another object of the present invention is to provide a new game lifting apparatus that prevents the user from injuring one's back while trying transport a game animal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
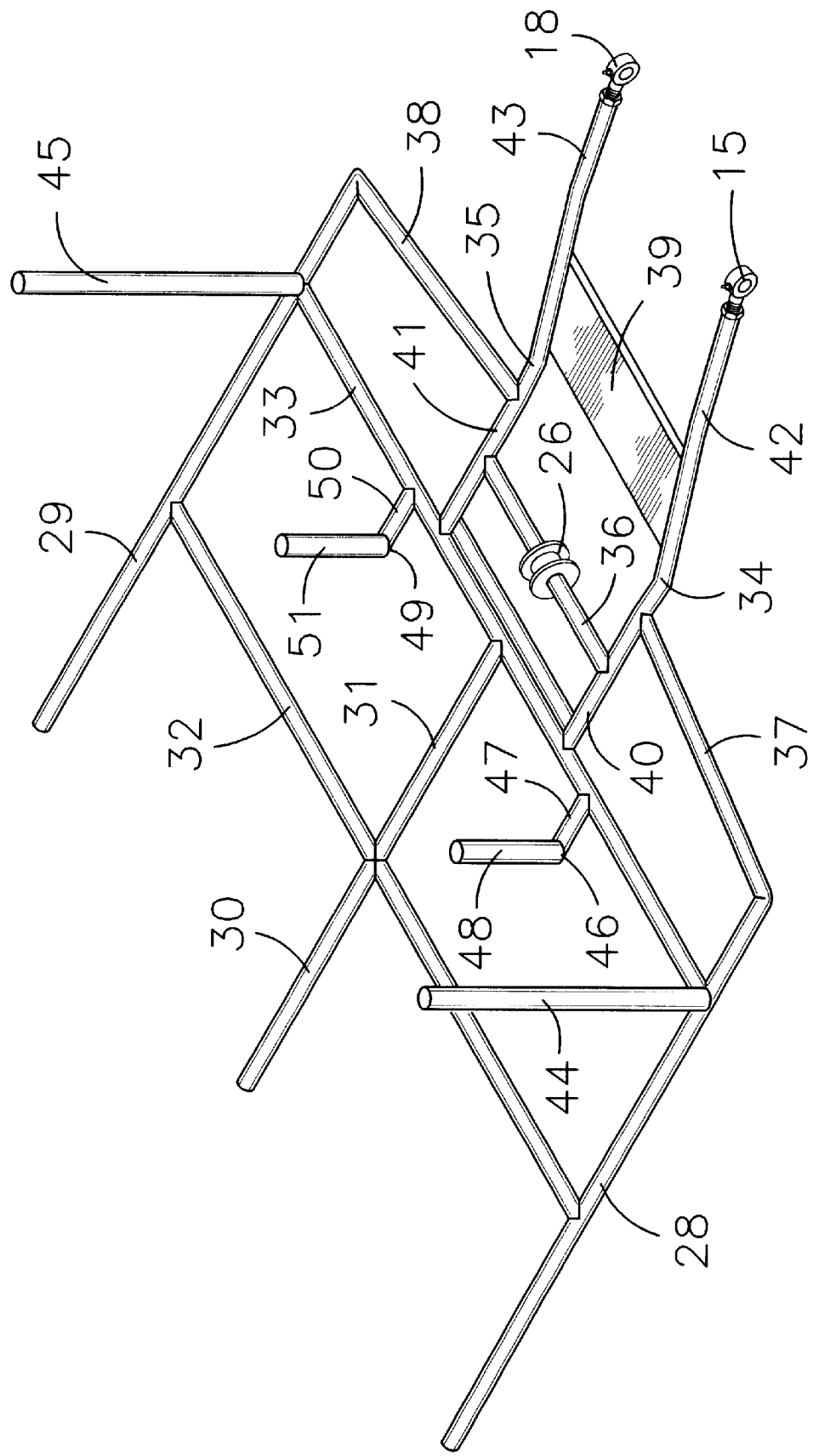
FIG. 1 is a perspective view of a new game lifting apparatus according to the present invention and shown in use.
Figure 2:
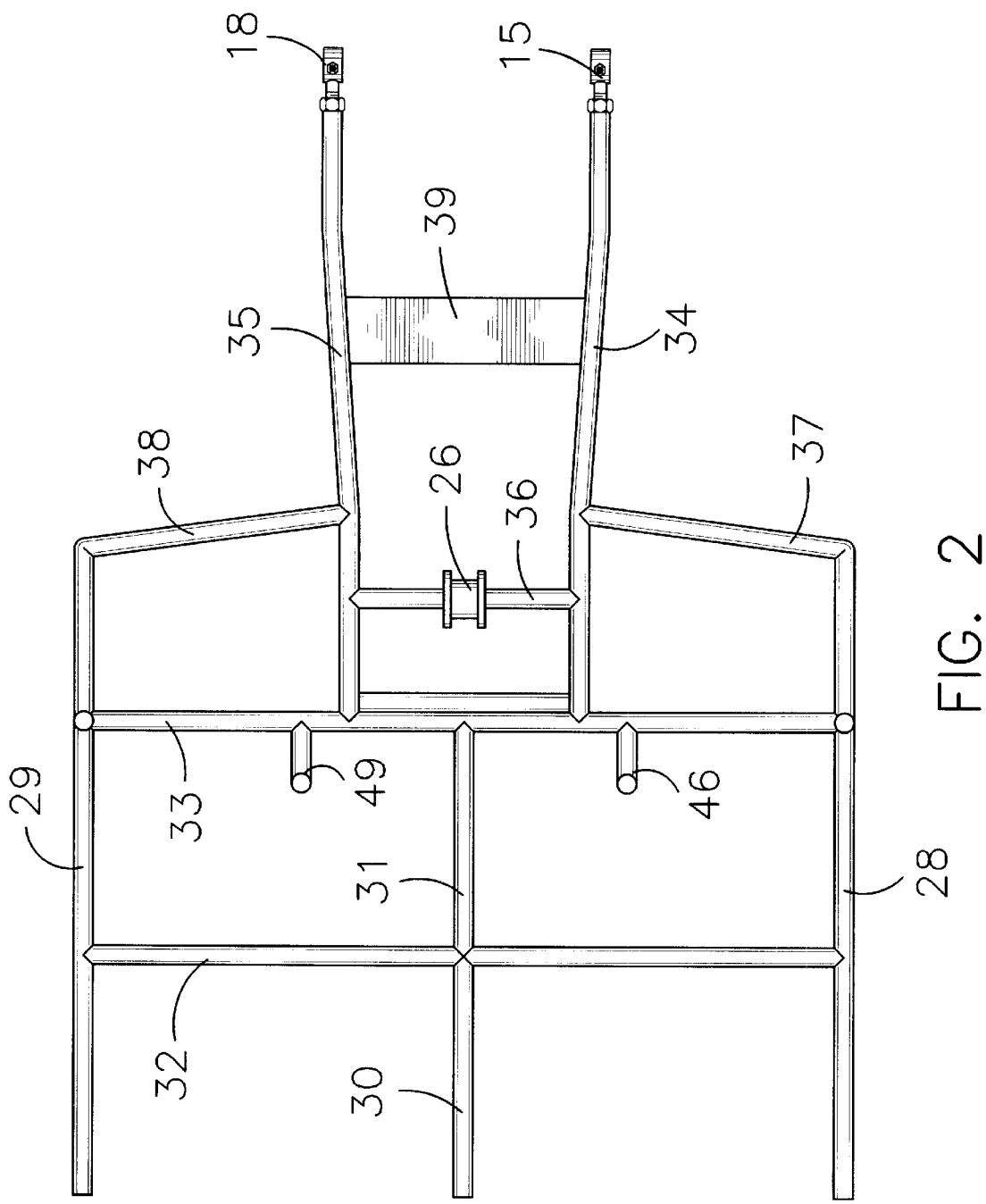
FIG. 2 is a top plan view of the present invention.
Figure 3:
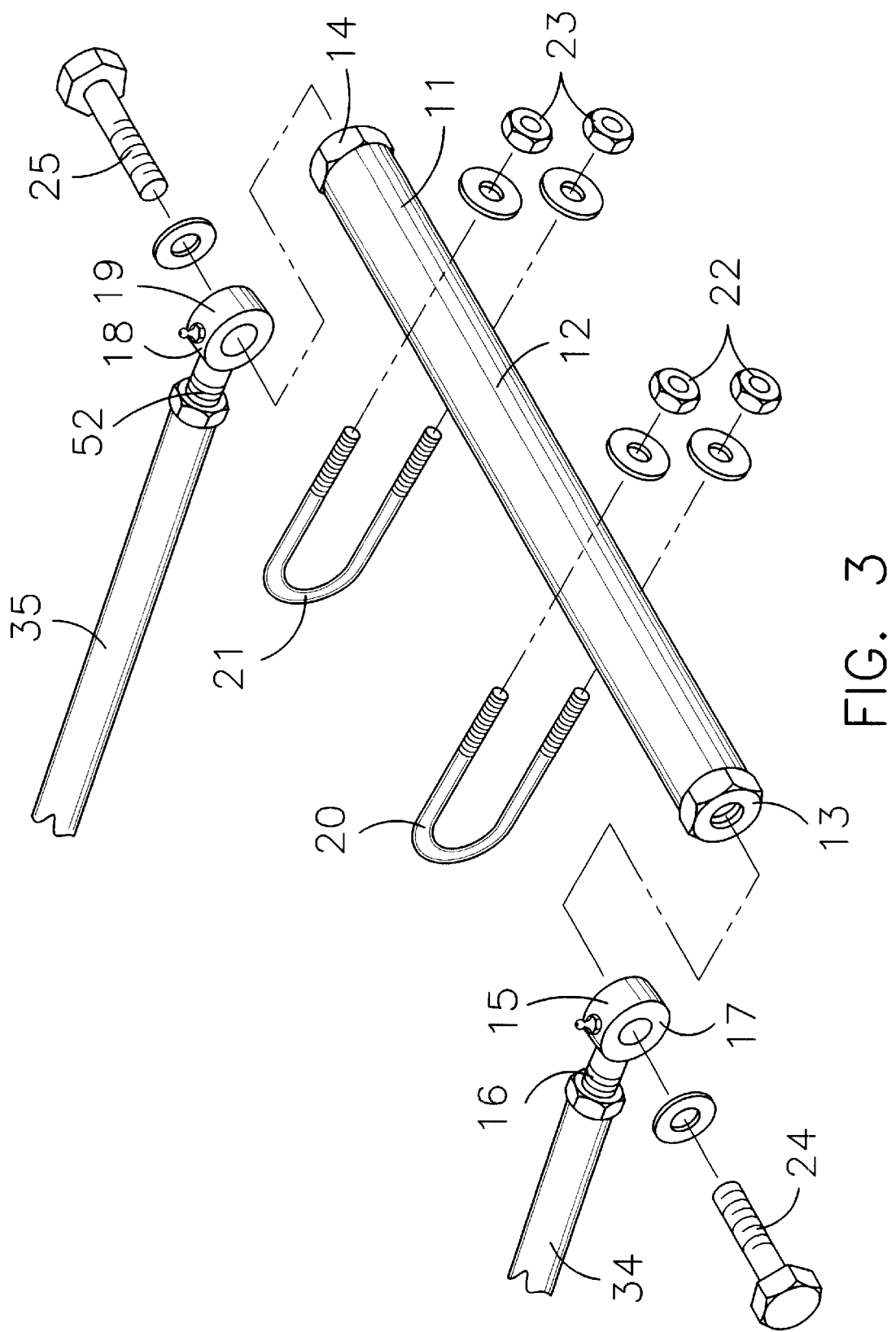
FIG. 3 is a partial exploded view of the rack and the rack support assembly of the present invention.
Figure 4:
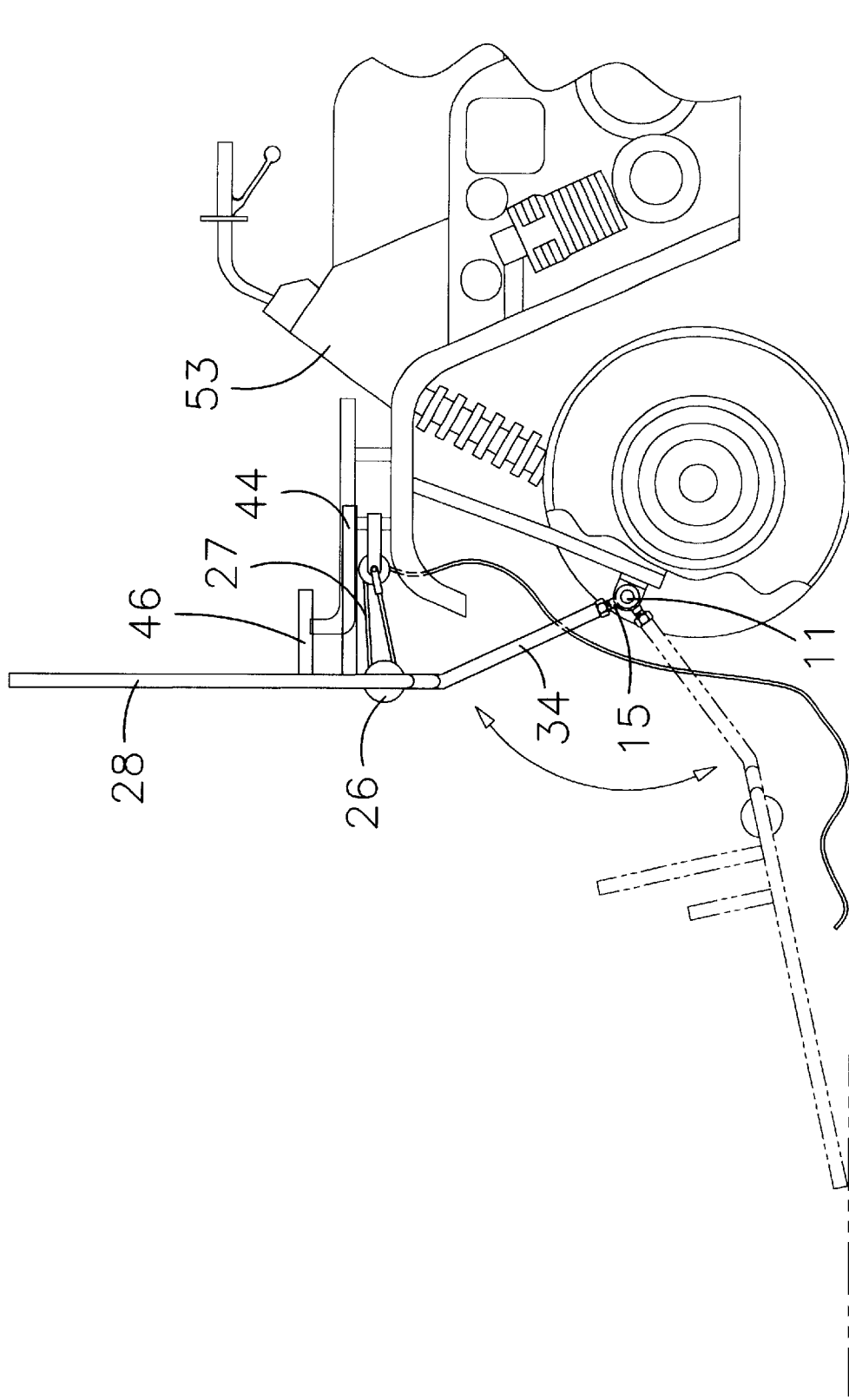
FIG. 4 is a side elevational view of the present invention shown in use.

With reference now to the drawings, and in particular to FIGS. 1 through 4 thereof, a new game lifting apparatus embodying the principles and concepts of the present invention and generally designated by the reference numeral 10 will be described.

As best illustrated in FIGS. 1 through 4, the game lifting apparatus 10 generally comprises a rack support assembly including a rack support member 11 being adapted to securely mount to a prime mover 53, and also including a pair of bracket members 15,18 being fastenable to the rack support member 11. The rack support assembly further includes fastening members being adapted to fasten the rack support member 11 to the prime mover 53. The rack support member 11 includes an elongate tubular member 12 and nut members 13,14 being securely and conventionally attached at ends of the elongate tubular member 12. The bracket members 15,18 are fastened with bolts 24,25 to the nut members 13,14. Each of the bracket members 15,18 includes a threaded shaft 16,52 and also including a grommet 17,19 being securely and conventionally attached at ends of the threaded shaft 16,52. The bolts 24,25 are removably extended through the grommets 17,19 and are threaded into the nut members 13,14. The fastening members includes U-shaped bolts 20,21 and nuts 22,23 for securely fastening the elongate tubular member 12 to the prime mover 53. The rack support assembly also includes a pulley 26 being securely and conventionally mounted upon a rack assembly and being adapted to carry a flexible line 27 thereabout.

The rack assembly is conventionally attached to the bracket members 15,18 for supporting and lifting a game thereupon. The rack assembly includes a plurality of elongate frame members, and also includes a plurality of game support members being conventionally attached to and extended from the elongate frame members for supporting the game thereupon. The plurality of elongate frame members includes a pair of elongate side members 28,29 being spaced apart, and also includes a pair of elongate cross members 32,33 conventionally interconnecting the elongate side members 28,29, and further includes two elongate intermediate members 30,31 being spaced from and disposed between the elongate side members 28,29 and being conventionally attached and welded to the elongate cross members 32,33, and also includes arm members 34,35 being conventionally connected to one of the elongate cross members 33 and extending outwardly therefrom, and further includes a pulley support member 36 conventionally interconnecting the arm members 34,35 and to which the pulley 26 is mounted, and also includes elongate brace members 37,38 being conventionally attached to the elongate side members 28,29 and to the arm members 34,35, and further includes an arm support member 39 conventionally interconnecting the arm members 34,35. Each of the arm members 34,35 has a first portion 40,41 having an end which is conventionally attached to the one of the elongate cross members 33, and also has a second portion 42,43 being angled relative to the first portion 40,41 and having open ends and having bores extending therein through the open ends. The threaded shafts 16,52 of the bracket members 15,18 are threaded in the bores of the arm members 34,35. The game support members include rods 44,45 being oppositely and conventionally attached and welded to and extended from the elongate side members 28,29, and also include angled support members 46,49 being securely and conventionally attached to one of the elongate cross members 33. Each of the angled support members 46,49 has a first portion 47,50 which is conventionally attached to the elongate cross member 33 and extends outwardly generally parallel to the elongate side members 28,29, and also has a second portion 48,51 which is angled generally perpendicular to the first portion 47,50.

In use, after attaching the game lifting apparatus 10 to the prime mover 53, the user lowers the rack assembly to the ground by letting out the flexible line 27. The user then puts the game animal upon the rack assembly and then draws up the flexible line to pivot and raise the rack assembly so that the game animal can be rolled or moved off the rack assembly and upon the prime mover 53.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the game lifting apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A game lifting apparatus comprising:
   a rack support assembly including a rack support member being adapted to securely mount to a prime mover, and also including bracket members being fastenable to said rack support member, said rack support assembly further including fastening members being adapted to fasten said rack support member to the prime mover, said rack support member including an elongate tubular member and nut members being securely attached at ends of said elongate tubular member; and
   a rack assembly being attached to said bracket members for supporting and lifting a game thereupon, said bracket members being fastened with bolts to said nut members, each of said bracket members including threaded shafts and also including grommets being securely attached at ends of said threaded shafts, said bolts being removably extended through said grommets and being threaded into said nut members.

2. A game lifting apparatus as described in claim 1, wherein said fastening members includes U-shaped bolts and nuts for securely fastening said elongate tubular member to the prime mover.

3. A game lifting apparatus as described in claim 1, wherein said rack support assembly also includes a pulley being securely mounted upon said rack assembly and being adapted to carry a flexible line thereabout.

4. A game lifting apparatus as described in claim 3, wherein said rack assembly includes a plurality of elongate frame members, and also includes a plurality of game support members being attached to and extended from said elongate frame members for supporting the game thereupon.

5. A game lifting apparatus as described in claim 4, wherein said plurality of elongate frame members includes elongate side members being spaced apart, and also includes a plurality of elongate cross members interconnecting said elongate side members, and further includes at least one elongate intermediate member being spaced from and disposed between said elongate side members and being attached to said elongate cross member, and also includes arm members being connected to one of said elongate cross members and extending outwardly therefrom, and further includes a pulley support member interconnecting said arm members and to which said pulley is mounted, and also includes elongate brace members being attached to said elongate side members and to said arm members, and further includes an arm support member interconnecting said arm members.

6. A game lifting apparatus as described in claim 5, wherein each of said arm members has a first portion having an end which is attached to said one of said elongate cross members, and also has a second portion being angled relative to said first portion and having open ends and having bores extending therein through said open ends.

7. A game lifting apparatus as described in claim 6, wherein said threaded shafts of said bracket members being threaded in said bores of said arm members.

8. A game lifting apparatus as described in claim 4, wherein said game support members include rods being opposedly attached to and extended from said elongate side members, and also include angled support members being securely attached to one of said elongate cross members; each of said angled support members having a first portion which is attached to said one of said elongat cross members and extends outwardly generally parallel to said elongate side members, and also having a second portion which is angled generally perpendicular to said first portion.

* * * * *